US009863359B2

(12) United States Patent
Melis et al.

(10) Patent No.: US 9,863,359 B2
(45) Date of Patent: Jan. 9, 2018

(54) METHOD OF CONTROLLING AN INJECTION DWELL TIME BETWEEN TWO INJECTIONS OF A FUEL INJECTOR

(71) Applicant: GM GLOBAL TECHNOLOGY OPERATIONS LLC, Detroit, MI (US)

(72) Inventors: Massimiliano Melis, Rivoli (IT); Francesco Pesce, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 114 days.

(21) Appl. No.: 14/871,217

(22) Filed: Sep. 30, 2015

(65) Prior Publication Data

US 2016/0090936 A1   Mar. 31, 2016

(30) Foreign Application Priority Data

Sep. 30, 2014   (GB) .................................. 1417212.6

(51) Int. Cl.
*F02D 41/10*   (2006.01)
*F02D 41/40*   (2006.01)
(Continued)

(52) U.S. Cl.
CPC ......... *F02D 41/401* (2013.01); *F02D 41/247* (2013.01); *F02D 41/2467* (2013.01);
(Continued)

(58) Field of Classification Search
CPC ...... F02D 41/401; F02D 41/402; F02D 41/26; F02D 41/20; F02D 41/403; F02D 41/40;
(Continued)

(56) References Cited

U.S. PATENT DOCUMENTS 6,386,176 B1 *   5/2002   McGee ................. F02D 41/401
                                                                123/299
8,725,388 B2 *   5/2014   Guglielmone ........ F02D 41/401
                                                                123/299
(Continued)

FOREIGN PATENT DOCUMENTS

EP   1344923 A2   9/2003
GB   2498355 A    7/2013

OTHER PUBLICATIONS

Great Britain Patent Office, Great Britain Search Report for Great Britain Application No. 1417212.6, dated Jan. 19, 2015.

*Primary Examiner* — Lindsay Low
*Assistant Examiner* — George Jin
(74) *Attorney, Agent, or Firm* — Lorenz & Kopf, LLP (57) ABSTRACT

A system and method of controlling the hydraulic dwell time between a first injection and a second injection performed by a fuel injector of an internal combustion engine are disclosed, in which the injector is equipped with a needle operated by a control valve. A value of a nominal electric dwell time between the first injection and the second injection is determined. An actual instant of hydraulic closing of the fuel injector after the first injection is also determined. A corrected electric dwell time is calculated as a function of the nominal electric dwell time and the actual instant of hydraulic closing of the fuel injector after the first injection. The fuel injector is operated using the corrected electric dwell time.

11 Claims, 5 Drawing Sheets

(51) Int. Cl.
*F02D 41/24* (2006.01)
*F02D 41/20* (2006.01)

(52) U.S. Cl.
CPC ......... *F02D 41/402* (2013.01); *F02D 41/403* (2013.01); *F02D 2041/2055* (2013.01); *F02D 2200/063* (2013.01); *Y02T 10/44* (2013.01)

(58) Field of Classification Search
CPC ................ F02D 41/061; F02D 41/345; F02D 2041/2055; F02D 1/16; F02M 47/027; F02M 63/0024; F02M 63/004; F02M 63/008; F02M 63/007; F02M 2200/306; F02B 3/06
USPC .................................................. 123/478, 472
See application file for complete search history.

(56) References Cited

U.S. PATENT DOCUMENTS

| | | | |
|---|---|---|---|
| 8,893,685 B2 | 11/2014 | Melis et al. | |
| 2012/0035832 A1* | 2/2012 | Stucchi | F02M 47/027 701/104 |
| 2012/0035833 A1* | 2/2012 | Melis | F02D 41/401 701/104 |
| 2013/0167808 A1* | 7/2013 | Stucchi | F02D 41/402 123/478 |
| 2014/0027534 A1* | 1/2014 | Rapp | F02M 47/027 239/71 |

* cited by examiner

METHOD OF CONTROLLING AN INJECTION DWELL TIME BETWEEN TWO INJECTIONS OF A FUEL INJECTOR

CROSS-REFERENCE TO RELATED APPLICATION

This application claims priority to Great Britain Patent Application No. 1417212.6, filed Sep. 30, 2014, which is incorporated herein by reference in its entirety.

TECHNICAL FIELD

The present disclosure pertains to a method of controlling an injection dwell time between two injections of a fuel injector of an internal combustion engine of a motor vehicle.

BACKGROUND

It is known that a conventional fuel injection system for a combustion engine includes a fuel rail and a plurality of electrically controlled fuel injectors, which are hydraulically connected with the fuel rail by means of respective feeding conduits. Each fuel injector generally includes a fuel inlet, a fuel outlet and a movable needle which repeatedly opens and closes the fuel outlet. When the needle is in an open position, fuel is injected under pressure into a cylinder of the engine. The movable needle is actuated with the aid of a dedicated actuator, typically a solenoid actuator or a piezoelectric actuator, which is driven by an electric circuit controlled by an Engine Control Unit (ECU). The ECU operates each injection pulse by generating an electric opening command acting upon a control valve and causing the needle to open the fuel injector, and a subsequent electric closing command, causing the needle to close the fuel injector.

The timing of the opening and closing electric commands is also controlled by the ECU, which determines two key parameters for each injection pulse, namely an electric Energizing Time (ET) and an electric Dwell Time (DT). The electric Energizing Time (ET) is the time between the instant in which the electric opening command of an injection pulse is generated, and the instant in which the electric closing command of the same injection pulse will be generated. The electric energizing time is generally determined by ECU as a function of the quantity of fuel to be injected in the course of the injection pulse, taking into account the value of the pressure inside the fuel rail. The Dwell Time (DT) indicates the time interval included between two consecutive injection pulses, namely the time interval between the end of the Energizing Time (ET) of a first injection pulse and the Start of Injection (SOI) of a second consecutive injection pulse.

In order to improve the characteristics of exhaust emissions and reduce combustion noise in engines, particularly in Diesel engines having a common-rail fuel injection system, so-called multiple fuel injection patterns are adopted. In a multi-injection pattern the fuel quantity to be injected in each cylinder at each engine cycle is split into a plurality of injections. More specifically, in a multi-injection pattern, for each engine cycle, a train of injections is performed by each injector typically, starting from a pilot injection and following with a main injection, which gives all or most of the torque in an engine cycle, eventually terminating with after and post injections.

The number of injections of the train of injections and their timing is dependent on the combustion mode and is determined by an Electronic Control Unit of the engine. The Energizing Time and Dwell Time values are generally predetermined with reference to an injection system having nominal characteristics, i.e. with components having no drifts and mapped in a data carrier or memory associated with the ECU. Reducing the Dwell Time (DT) between two consecutive injections below a proper critical value causes the hydraulic fusion of the pilot and main injection, a condition also referred as Injection Quantity Fusion (IQF). An IQF strategy is able to give benefits in terms of Brake Specific Fuel Consumption (BSFC) and/or Combustion Noise (CN) and/or Soot emissions, depending on the calibration used. In particular, a pilot injection before a main injection is an enabler for a better fuel spray atomization and therefore increases combustion efficiency.

Even better than an IQF strategy, is a condition such as Zero Hydraulic Interval (ZHI) between a pilot injection and a main injection, namely a condition in which there is no interval between the hydraulic closing of the needle of the injection after a pilot injection and the hydraulic opening of the needle for a main injection. ZHI may be the best strategy for having the same IQF benefits above mentioned but also very stable injection hydraulics as in standard injection patterns. However, ZHI is a critical and difficult condition to reach and maintain because the electrical Dwell Time (DT) range for controlling the ZHI is very narrow and therefore it is difficult to maintain it along engine life due to disturbances such as injector's aging drift.

In fact, a calibrated nominal electrical DT value is actually used for managing the ZHI strategy, this electrical DT value being held constant for all the rail pressure levels. However the use of a constant electrical DT value is not sufficient for ensuring the correct strategy actuation versus all the engine working conditions and versus ha are drift, such as for example injector's aging drift.

It is, therefore, desirable to provide a strategy that allows the injector to operate in a Zero Hydraulic Interval (ZHI) condition throughout the life of the injector. It is also desirable to reach the above result without using complex devices and by taking advantage from the computational capabilities of the Electronic Control Unit (ECU) of the vehicle.

SUMMARY

In accordance with the present disclosure a method is provided for controlling the hydraulic dwell time between a first injection and a second injection performed by a fuel injector of an internal combustion engine, which is being equipped with a needle operated by means of a control valve. A value of a nominal electric dwell time between the first injection and the second injection is determined. An actual instant of hydraulic closing of the fuel injector after the first injection is also determined. A corrected electric dwell time is calculates as a function of the nominal electric dwell time and the actual instant of hydraulic closing of the fuel injector after the first injection. The fuel injector is then operated using the corrected electric dwell time. An advantage of this embodiment is that it corrects the dwell time to be applied for starting a second injection after a first injection by correcting the drift of the injector during its life using a closed loop strategy.

According to a further embodiment of the present disclosure, the actual instant of hydraulic closing of the fuel injector after the first injection is estimated using a map that correlates an energizing time of the injector with a needle closing time of the injector. An advantage of this embodiment is that it determines the actual instant of closing of the injector needle even if the injector is not equipped with a needle closing sensor.

According to still another embodiment of the present disclosure, the map is used for determining a nominal injector needle closing time value as a function of a nominal energizing time of the injector and determining a corrected needle closing time value as a function of a corrected energizing time of the injector, in order to estimate an actual needle closing time as a difference between the nominal injector's needle closing time value and the corrected needle closing time value. An advantage of this embodiment is that it determines the actual instant of closing of the injector's needle as a function of the performance of the injector as mapped in an experimental map.

According to another embodiment, the corrected energizing time is determined with by means of a learning procedure performed on the injector. An advantage of this embodiment is that it uses data that can be learned during the use of the injector.

According to another embodiment the learning procedure determines a value of a nominal control valve closing time as a function of a nominal energizing time of the injector. An actual control valve closing time is detected with a valve closing sensor of the injector. A valve closing time correction factor is calculated as a difference between the detected control valve closing time and the nominal control valve closing time. The corrected energizing time is calculated as a function of the nominal energizing time and the valve closing time correction factor. An advantage of this embodiment is that it determines a drift that may influence the performance of the injector's needle by using a valve closing sensor generally provided in injectors.

According to another embodiment, the learning procedure is performed on injections that occur after a main injection. An advantage of this embodiment is that it takes advantage of favorable conditions that may occur during after injections in order to determine data relative to the performance of the injector's control valve.

According to still another embodiment of the present disclosure, the actual instant of hydraulic closing of the fuel injector after the first injection is determined by a sensor that detects the closing of a needle of the fuel injector. An advantage of this embodiment is that it measures directly the needle closing time during the life of the injector.

Another embodiment of the present disclosure provides a method for controlling the hydraulic dwell time between a first injection and a second injection performed by a fuel injector of an internal combustion engine, the injector being equipped with a needle operated by means of a control valve. A value of a nominal electric dwell time between the first injection and the second injection and an actual instant of hydraulic closing of the fuel injector after the first injection is determined. A corrected electric dwell time is calculated as a function of the nominal electric dwell time and the actual instant of hydraulic closing of the fuel injector after the first injection. The fuel injector is operated using the corrected electric dwell time. An advantage of this embodiment is that it corrects the dwell time to be applied for starting a second injection after a first injection by correcting in closed loop the drift of the injector during its life.

According to a further embodiment of the present disclosure, the actual instant of hydraulic closing of the fuel injector after the first injection is determined by an estimation procedure using a map that correlates an energizing time of the injector with a needle closing time of the injector. An advantage of this embodiment is that it determines the actual instant of closing of the injector's needle even if the injector is not equipped with a needle closing sensor.

According to still another embodiment of the present disclosure, a map is used for determining a nominal injector needle closing time value as a function of a nominal energizing time of the injector and for determining a corrected needle closing time value as a function of a corrected energizing time of the injector, in order to estimate an actual needle closing time as a difference between the nominal injector's needle closing time value and the corrected needle closing time value. An advantage of this embodiment is that it determines the actual instant of closing of the injector needle as a function of the performance of the injector as mapped in an experimental map.

According to another embodiment, the corrected energizing time is determined with a learning procedure performed on the injector. An advantage of this embodiment is that it uses data that can be learned during the use of the injector.

According to another embodiment, the learning procedure is performed by determining a value of a nominal control valve closing time as a function of a nominal energizing time of the injector, detecting an actual control valve closing time by means of a valve closing sensor of the injector, calculating a valve closing time correction factor as a difference between the detected control valve closing time and the nominal control valve closing time, and calculating the corrected energizing time as a function of the nominal energizing time and the valve closing time correction factor. An advantage of this embodiment is that it determines a drift that may influence the performance of the injector's needle by using a valve closing sensor generally provided in injectors.

According to another embodiment, the learning procedure is performed based on injections that occur after a main injection. An advantage of this embodiment is that it takes advantage of favorable conditions that may occur during after injections in order to determine data relative to the performance of the control valve of the injector.

According to still another embodiment of the present disclosure, the actual instant of hydraulic closing of the fuel injector after the first injection is determined by a sensor that detects the closing of a needle of the fuel injector. An advantage of this embodiment is that it measures directly the needle closing time during the life of the injector.

The method according to one of its aspects can be carried out with the help of computer program including a program-code for carrying out all the steps of the method described above, and in the form of computer program product including the computer program. The computer program product can be embodied as a control apparatus for an internal combustion engine, including an Electronic Control Unit (ECU), a data carrier associated to the ECU, and the computer program stored in a data carrier, so that the control apparatus defines the embodiments described in the same way as the method. In this case, when the control apparatus executes the computer program all the steps of the method described above are carried out. A still further aspect of the disclosure provides an internal combustion engine specially arranged for carrying out the method claimed.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
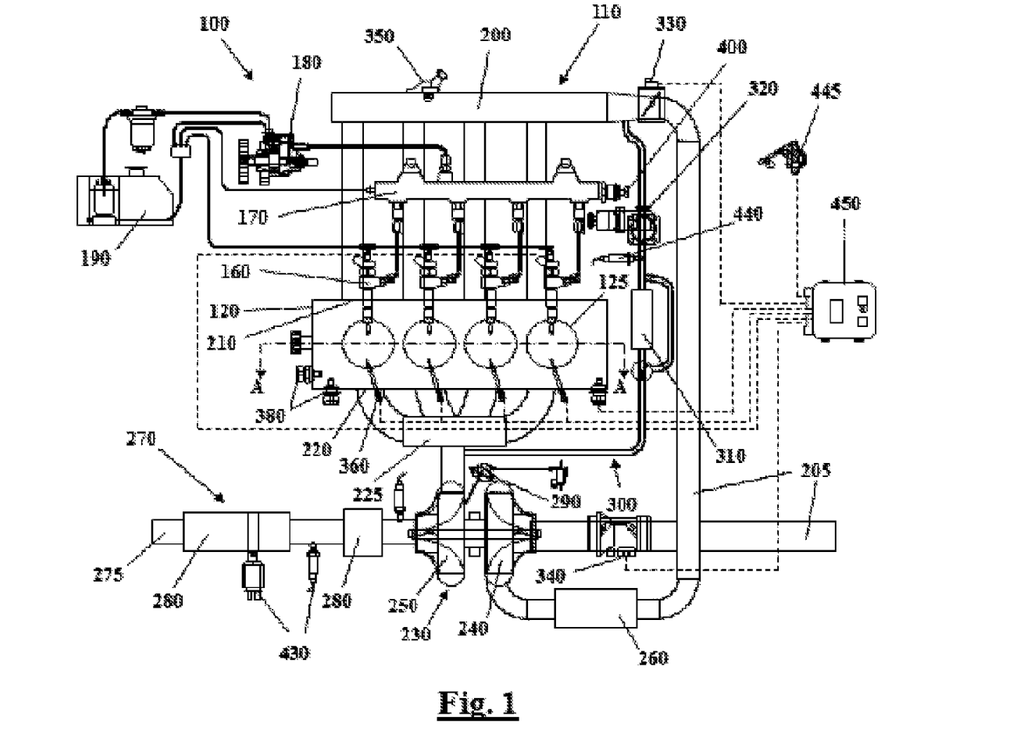
FIG. 1 shows an automotive system.
Figure 2:
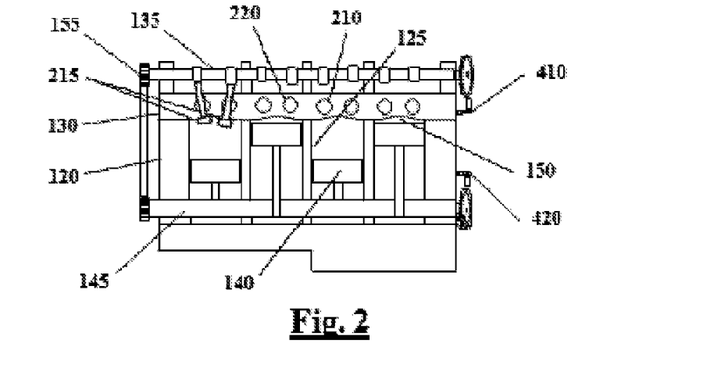
FIG. 2 is a cross-section of an internal combustion engine belonging to the automotive system of FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after-treatment devices 280. The after-treatment devices may be any device configured to change the composition of the exhaust gases. Some examples of after-treatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the FOR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an FOR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system, or data carrier 460, and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carry out the steps of such methods and control the ICE 110.

The program stored in the memory system is transmitted from outside via a cable or in a wireless fashion. Outside the automotive system 100 it is normally visible as a computer program product, which is also called computer readable medium or machine readable medium in the art, and which should be understood to be a computer program code residing on a carrier, said carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a Wi-Fi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

Figure 3:
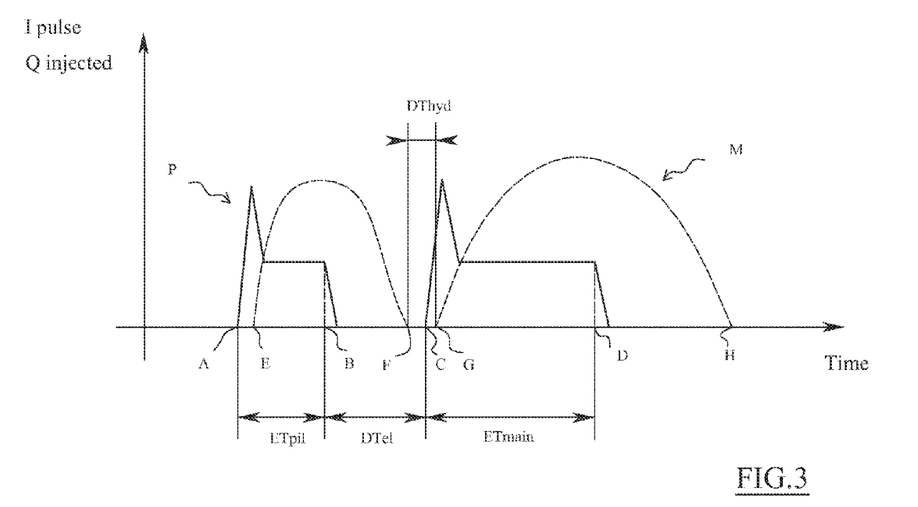
FIG. 3 is a schematic illustration of a portion of a fuel injection pattern, which shows along a timeline two subsequent injection pulses performed by a fuel injector belonging to the internal combustion engine of FIG. 2.

With reference to FIG. 3, a schematic illustration of a portion of a fuel injection pattern is illustrated in which a timeline shows two subsequent injection pulses performed by a same fuel injector 160 belonging to the internal combustion engine 110 of FIG. 2. The injector 160 is equipped with a needle 500 (FIG. 5) which is actuated with the aid of a control valve 525, for example a dedicated solenoid actuator, which is in turn operated by an electric driving circuit configured for supplying the solenoid actuator with an electric current. When the solenoid actuator is supplied with the electric current, it moves the needle 500 in the opening position. When this electric current is cut off, the needle 500 returns in a closing position pushed by a spring 510.

Figure 5:
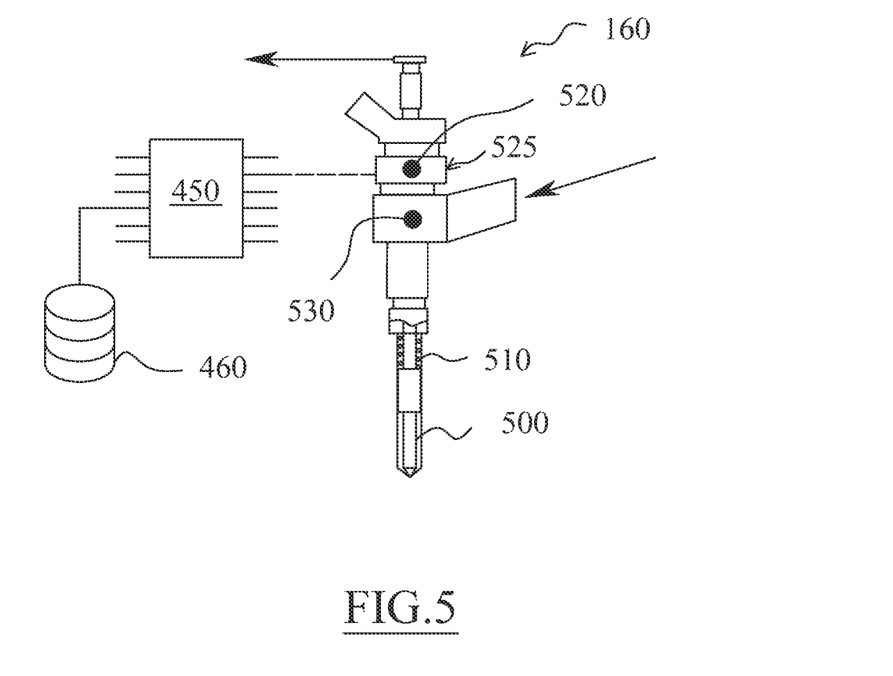
FIG. 5 is a schematic representation, partly in cross-section of an injector used in the various embodiments of the method described herein.

The electric driving circuit is controlled by the ECU 450, which is provided for repeatedly generating an electric opening command, causing the electric driving circuit to supply the solenoid actuator with the electric current, followed by an electric closing command, causing the electric driving circuit to cut off the electric current. In this way, the needle 500 is commanded by the ECU 450 so as to repeatedly open and close the fuel injector 160, in order to inject the fuel into the cylinder 125 through a plurality of separated injection pulses.

In particular, the ECU 450 is configured for commanding the fuel injector 160 to perform a plurality of fuel injection pulses per engine cycle, according to a multi-injection pattern which generally includes at least a first injection pulse, typically a pilot injection, followed by a second injection pulse, typically a main injection. In other embodiments, the main injection may be split in two or more closely spaced injections. As an illustrative example, a first injection pulse and a second injection pulse are respectively indicated with P and M in FIG. 3, wherein the solid line represents the plot of the electric current supplied to the solenoid actuator, and the dotted line represents the plot of the flow rate of the injected fuel. The injector 160 may also be equipped with a control valve sensor 530 capable of detecting the closure of the control valve 525 and with a needle closing sensor 520 capable of detecting the closure of the needle 500.

Referring again to FIG. 3, point A of the timeline indicates the instant in which the ECU 450 generates the electric opening command causing the electric driving circuit to supply the electric current responsible of the first injection pulse P. Point B of the timeline indicates the instant in which the ECU 450 generates the electric closing command causing the electric driving circuit to cut off the electric current responsible for the first injection pulse P. Moreover, point C indicates the instant in which the ECU 450 generates the electric opening command causing the electric driving circuit to supply the electric current responsible of the second injection pulse M and point D indicates the instant in which the ECU 450 generates the electric closing command causing the electric driving circuit to cut off the electric current responsible of the second injection pulse M.

The time difference between points B and A represents an Energizing Time $E_{tp}$ for the first injection and the time difference between points D and C represents an Energizing Time $E_{Tm}$, for the second injection. The time difference between points C and B represents an injector electrical Dwell Time $DT_{el}$ between the end of the pilot injection and the start of the main injection. Furthermore, point E of the timeline indicates the instant in which the fuel injector 160 actually opens, thereby causing the first injection pulse P to actually start. Point F indicates the instant in which the fuel injector 160 actually closes, thereby causes the first injection pulse P to end. Point G indicates the instant in which the fuel injector 160 actually opens again, thereby causing the second injection pulse M to start. Lastly, point H indicates the instant in which the fuel injector 160 actually closes, thereby causing the second injection pulse M to end.

As clearly shown, the instant in which the ECU 450 generates an electric opening command does not generally coincide with the instant in which the fuel injector 160 actually opens, as well as the instant in which the ECU 450 generates an electric closing command generally does not coincide with the instant in which the fuel injector actually closes. Furthermore, during the use of the injector 160, the performance of the same may change due to aging and/or various other factors in such a way that the mapped patterns of injections are not performed as desired.

Figure 4:
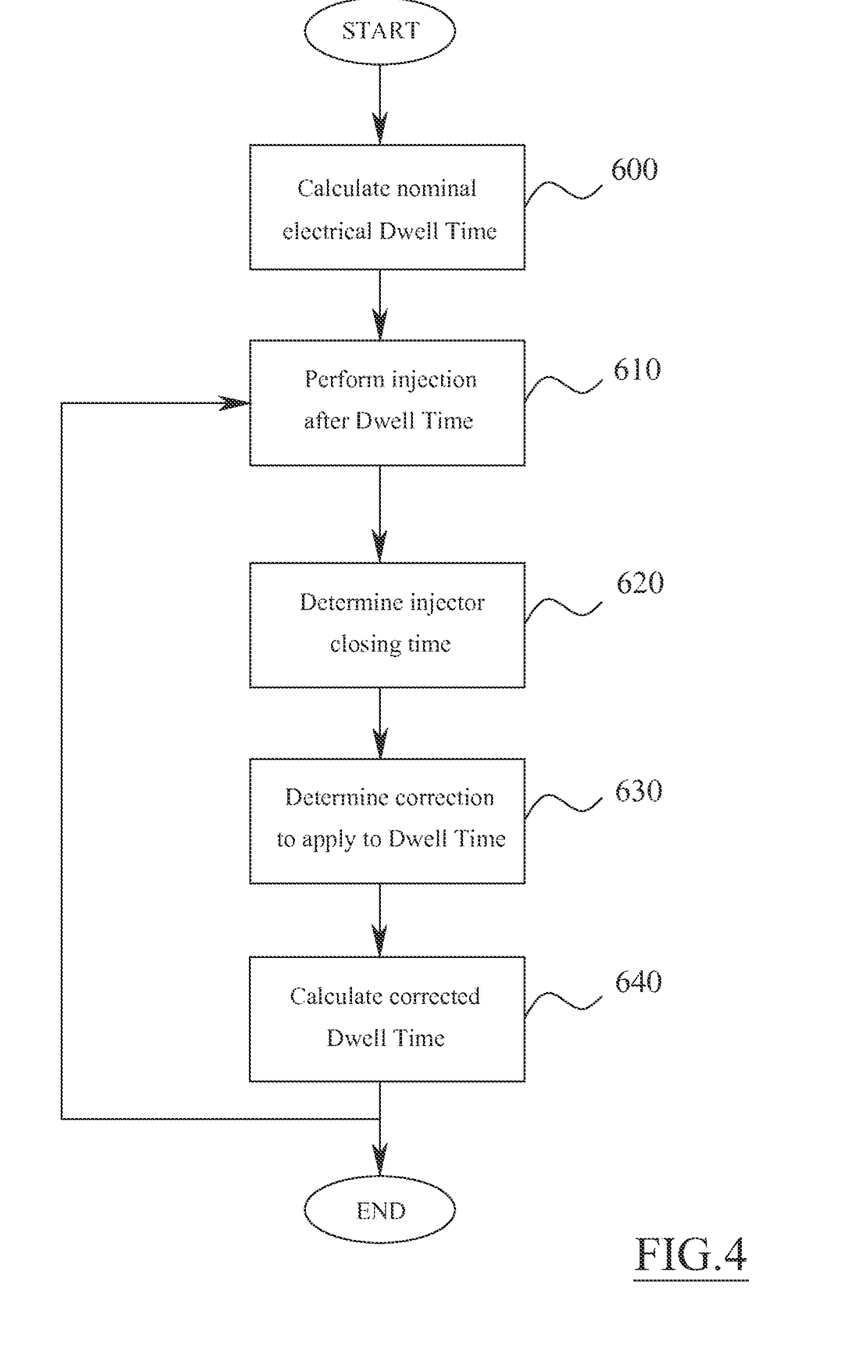
FIG. 4 is a flowchart representing a method of controlling an injection dwell time between two pulses of a fuel injector of an internal combustion engine of a motor vehicle shown in FIG. 3.

An embodiment of the method is now described in reference to the flowchart of FIG. 4. A first step is to calculate a nominal (or base) electrical Dwell Time between two subsequent fuel injections by the same injector 160, for example a pilot and a main injection (block 600). This calculation may be done, for example, by using a map that has the desired injection quantity and the rail pressure as input. Then a second fuel injection is performed after a first injection by energizing the injector 160 after a Dwell Time equal to the nominal Dwell Time calculated (block 610).

In the same injection cycle, an injector actual closing time after the first injection is determined (block 620). This determination can be done indirectly, by means of the method described hereinafter with reference to FIG. 5 or directly, in case the injector 160 is equipped with a needle closing sensor 520. In each case, when the instant of closure of the needle is determined, a correction to be applied the nominal electrical Dwell Time to be used in a subsequent injection cycle can be determined (block 630), in order to obtain an injection which is as close as possible to the Zero Hydraulic Interval (ZHI) condition.

In case the instant in which the fuel injector 160 actually closes (point F), occurs before the end of the nominal Dwell Time (as in FIG. 3), the electric Dwell Time may be corrected by subtracting to it a correction value in order to determine a corrected Dwell Time (block 640) that is used to perform a subsequent injection pattern. If, on the contrary, the instant in which the fuel injector 160 actually closes (point F), occurs after the end of the nominal Dwell Time, the electric Dwell Time may be corrected by adding to it a correction value in order to determine a corrected Dwell Time (block 640).

Figure 6:
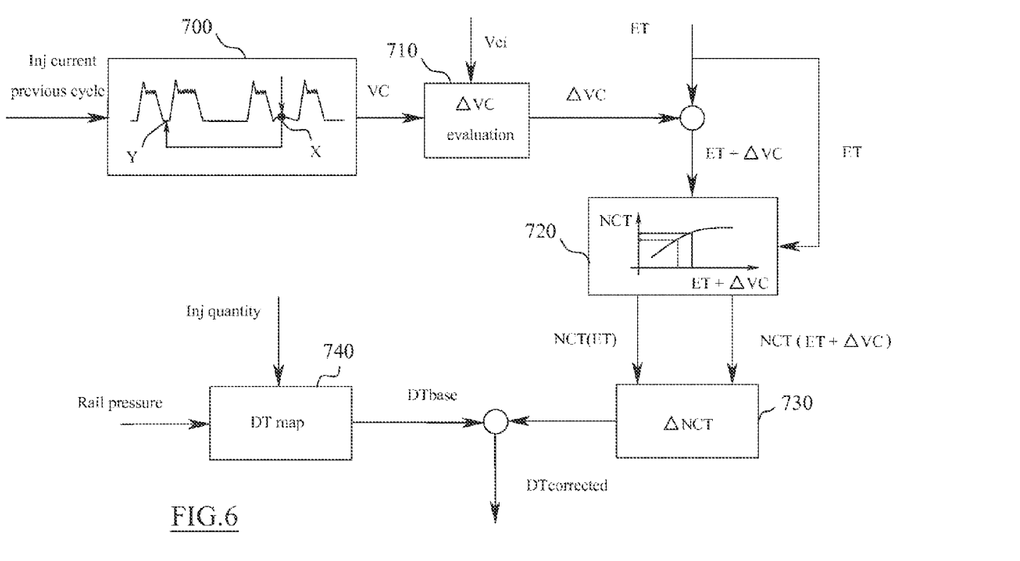
FIG. 6 is a flowchart representing an embodiment of a method of estimating a corrected dwell time.

FIG. 6 is a flowchart representing an embodiment of a method of estimating a corrected Dwell Time. As a first step of the method, a learning procedure is performed on the injector 160 (block 700). The learning procedure is performed using fuel injections that are not necessarily part of the pilot and main injection pattern, but may be for example after or post injections, namely injections that occur after a main injection in an injection pattern. These injections are helpful in determining easily data relative to the actual closing time of the control valve 525 of the injector 160 (point X of block 700), data that can then be applied to other injections in an injection cycle as explained hereinafter (point Y of block 700).

In this case, using the valve closing sensor 530 of the injector 160, it is possible to detect the actual injector's valve 525 closing time VC. This value can be compared with a nominal valve closing time value Vci, which is in turn a function of a nominal Energizing Time ET of the injector (160), in order to determine a valve closing time correction factor $\Delta VC$ calculated as a difference between the actual closing instant VC and the nominal closing time value Vci. In particular, $\Delta VC=VC-Vci$ (block 710).

In a second step of the method, a nominal Energizing Time ET is used to calculate a corrected energizing time $ET+\Delta VC$. A map that correlates the Energizing Time FT with a needle closing time value (NCT) is stored in the data carrier 460 associated with the ECU 450. This map may be determined by experimental procedures performed on the injector 160. Using this map it is therefore possible to calculate two values for the needle closing time: a nominal value NCT (ET) which is a function of the nominal Energizing Time ET and a corrected needle closing time value NCT $(ET+\Delta VC)$ which is a function of the corrected energizing time $ET+\Delta VC$, namely is a function of the nominal value ET corrected with the valve closing time correction factor $\Delta VC$ (block 720). Then a difference $\Delta NCT$ between these two values is calculated, namely $\Delta NCT=NCT (ET+\Delta VC)-NCT (ET)$ (block 730), in order to estimate an actual needle closing time.

A nominal electrical Dwell Time $DT_{base}$ between two subsequent fuel injections by the same injector 160 is then calculated by using a map that receives as input a desired injection quantity and a rail pressure value for an injection (block 740). Finally a corrected Dwell Time $DT_{corrected}$ is calculated as a function of the nominal electrical Dwell Time $DT_{base}$ and the estimated actual needle closing time value $\Delta NCT$.

Figure 7:
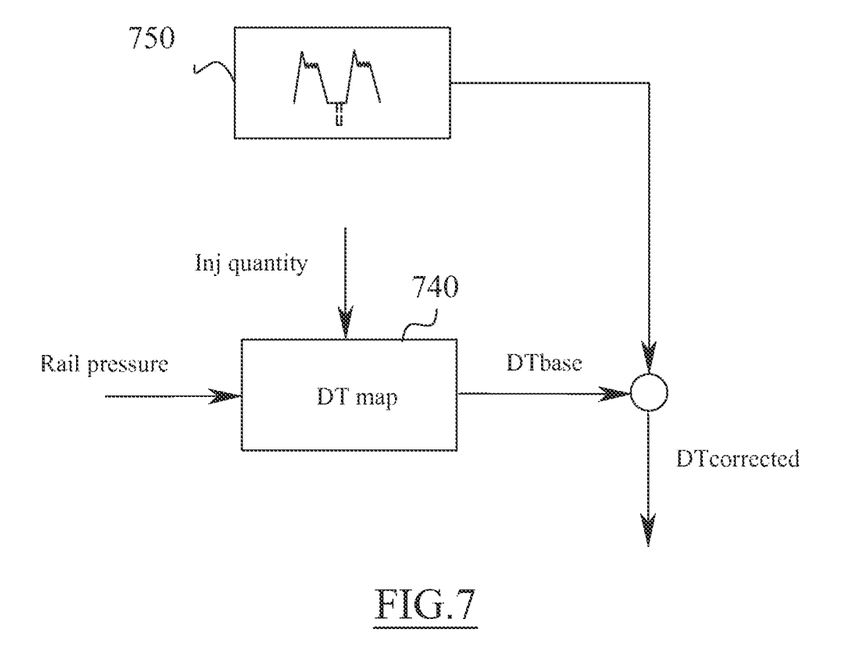
FIG. 7 is a flowchart representing another embodiment of a method of estimating a corrected dwell time.

FIG. 7 is a flowchart representing another embodiment of a method of estimating a corrected dwell time that can be used in all cases in which the injector 160 is equipped with a needle closing sensor 520. In this case, a nominal electrical Dwell Time $DT_{base}$ between two subsequent fuel injections by the same injector 160 is calculated by using a map that has the desired injection quantity and the rail pressure as input (block 740) as in the preceding step. Moreover, an actual instant of needle closure is determined using the needle closing sensor 520 of the injector 160. Finally a corrected Dwell Time $Dt_{corrected}$ can be calculated as a function of the nominal electrical Dwell Time $DT_{base}$ and the actual instant of needle closure, as determined by the needle closing sensor 520 of the injector 160.

All the embodiments described obtain a ZHI condition, by correcting the Dwell Time of the injections during the life of the injector 160.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of controlling the hydraulic dwell time between a first injection and a second injection performed by a fuel injector of an internal combustion engine, wherein the injector is equipped with a needle operated by a control valve, the method comprising:
 determining a value of a nominal electric dwell time between the first injection and the second injection;
 determining an actual instant of hydraulic closing of the fuel injector after the first injection;
 calculating a corrected electric dwell time as a function of the nominal electric dwell time and the actual instant of hydraulic closing of the fuel injector after the first injection;
 compensating for drift of the fuel injector by using the corrected electric dwell time; and
 controlling the fuel injector with a zero hydraulic interval cycle using the corrected electronic dwell time.

2. The method according to claim 1, wherein the actual instant of hydraulic closing of the fuel injector after the first injection is determined with an estimation procedure using a map that correlates an energizing time of the injector with a needle closing time of the injector.

3. The method according to claim 2, wherein the map is used to determine a nominal injector needle closing time value as a function of a nominal energizing time of the injector and to determine a corrected needle closing time value as a function of a corrected energizing time of the injector, in order to estimate an actual needle closing time as a difference between the nominal injector needle closing time value and the corrected needle closing time value.

4. The method according to claim 3, wherein the corrected energizing time is determined by a learning procedure performed on the injector.

5. The method according to claim 4, wherein the learning procedure comprises:
 determining a value of a nominal control valve closing time as a function of a nominal energizing time of the injector;
 detecting an actual control valve closing time from a valve closing sensor of the injector;
 calculating a valve closing time correction factor as a difference between the detected control valve closing time and the nominal control valve closing time; and
 calculating the corrected energizing time as a function of the nominal energizing time and the valve closing time correction factor.

6. The method according to claim 4, wherein the learning procedure is performed on injections that occur after a main injection.

7. The method according to claim 1, further comprising determining the actual instant of hydraulic closing of the fuel injector after the first injection with a sensor that detects the closing of the needle of the fuel injector.

8. An internal combustion engine comprising an electronic control unit configured to carrying out the method according to claim 1.

9. A non-transitory computer readable medium having a computer program which when executed on an electronic control unit performs the method according to claim 1.

10. An apparatus for controlling the hydraulic dwell time between a first injection and a second injection performed by a fuel injector of an internal combustion engine, wherein the injector is equipped with a needle operated by a control valve, the apparatus comprising an electronic control module configured to:
- determine a value of a nominal electric dwell time between the first injection and the second injection;
- determine an actual instant of hydraulic closing of the fuel injector after the first injection;
- calculate a corrected electric dwell time as a function of the nominal electric dwell time and the actual instant of hydraulic closing of the fuel injector after the first injection;
- compensate for drift of the fuel injector by using the corrected electric dwell time; and
- control the fuel injector with a zero hydraulic interval cycle using the corrected electronic dwell time.

11. An apparatus comprising a non-transitory computer readable medium having a computer program which when executed configures the electronic control unit according to claim 10.

* * * * *